US011323504B2

(12) United States Patent
Siegel et al.

(10) Patent No.: US 11,323,504 B2
(45) Date of Patent: *May 3, 2022

(54) CENTRALIZED CONTROL OF USER DEVICES VIA UNIVERSAL IP SERVICES REGISTRAR/HUB

(71) Applicant: AT&T Intellectual Property I, L.P., Atlanta, GA (US)

(72) Inventors: Steven A. Siegel, Mendham, NJ (US); Reuben Klein, East Brunswick, NJ (US); Leopold B. Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/107,289

(22) Filed: Aug. 21, 2018

(65) Prior Publication Data

US 2018/0359306 A1    Dec. 13, 2018

Related U.S. Application Data

(63) Continuation of application No. 13/652,673, filed on Oct. 16, 2012, now Pat. No. 10,084,848.

(51) Int. Cl.
*G06F 15/16*     (2006.01)
*H04L 67/025*    (2022.01)
*H04L 67/306*    (2022.01)

(52) U.S. Cl.
CPC ......... *H04L 67/025* (2013.01); *H04L 67/306* (2013.01)

(58) Field of Classification Search
USPC ........... 709/218, 206, 217, 203; 725/32, 33; 370/352; 455/456.1; 726/4, 7; 379/201.02
See application file for complete search history.

(56) References Cited

U.S. PATENT DOCUMENTS

| 6,385,652 | B1 * | 5/2002 | Brown ................... G06Q 20/04 709/218 |
| 7,072,932 | B1 * | 7/2006 | Stahl .................... H04L 67/2823 709/203 |
| 8,150,938 | B1 * | 4/2012 | Walsh ................... H04L 67/303 709/217 |
| 8,514,756 | B1 | 8/2013 | Ramachandra et al. |
| 8,755,368 | B2 | 6/2014 | Kuechenhoff et al. |
| 8,918,519 | B1 | 12/2014 | Bosch |
| 9,852,599 | B1 * | 12/2017 | Slavin ..................... H04W 4/90 |
| 2002/0124252 | A1 * | 9/2002 | Schaefer ............ H04N 21/4722 725/33 |
| 2005/0163108 | A1 * | 7/2005 | Moore .................... H04L 29/06 370/352 |

(Continued)

*Primary Examiner* — Quang N Nguyen
(74) *Attorney, Agent, or Firm* — Guntin & Gust, PLC; Robert Gingher

(57) ABSTRACT

A method and system for centralized control of user devices is disclosed. The method for centralized control of user devices via universal IP services registrar includes receiving a request to register a user device for a plurality of services, registering the user device for the plurality of services by creating a user settings profile for the user for each of the plurality of services, receiving data from the plurality of registered services, and transmitting received data to the user device in accordance with the user profile.

20 Claims, 4 Drawing Sheets

(56) References Cited

U.S. PATENT DOCUMENTS

| | | | |
|---|---|---|---|
| 2005/0239447 A1* | 10/2005 | Holzman | H04L 63/102 455/411 |
| 2005/0261058 A1 | 11/2005 | Nguyen et al. | |
| 2005/0271186 A1* | 12/2005 | Lichorowic | G08B 25/005 379/37 |
| 2007/0297590 A1* | 12/2007 | Macbeth | G06Q 10/00 379/201.02 |
| 2008/0127255 A1 | 5/2008 | Ress et al. | |
| 2008/0271068 A1* | 10/2008 | Ou | H04N 21/4348 725/32 |
| 2008/0313265 A1* | 12/2008 | Pounds | G06Q 30/0257 709/202 |
| 2010/0049790 A1 | 2/2010 | Schreiber | |
| 2010/0103242 A1 | 4/2010 | Linaker | |
| 2010/0138900 A1 | 6/2010 | Peterka et al. | |
| 2011/0145858 A1* | 6/2011 | Philpott | G06Q 30/02 725/32 |
| 2011/0302634 A1* | 12/2011 | Karaoguz | H04W 12/0806 726/4 |
| 2012/0179830 A1 | 7/2012 | Ait-Ameur et al. | |
| 2012/0192258 A1* | 7/2012 | Spencer | H04W 12/003 726/7 |
| 2012/0278399 A1* | 11/2012 | Turner | H04L 51/20 709/206 |
| 2013/0073403 A1 | 3/2013 | Tuchman et al. | |
| 2013/0104238 A1* | 4/2013 | Balsan | G06Q 30/0207 726/26 |
| 2015/0271666 A1* | 9/2015 | Arunachalam | H04L 63/20 455/410 |
| 2015/0365787 A1* | 12/2015 | Farrell | H04W 4/029 455/456.1 |
| 2016/0134929 A1 | 5/2016 | Mohammad et al. | |
| 2016/0338072 A1* | 11/2016 | Cohen | H04L 47/70 |
| 2017/0134182 A1* | 5/2017 | Davis | G01D 4/006 |
| 2018/0019914 A1* | 1/2018 | Su | H04L 41/0853 |
| 2018/0124129 A1 | 5/2018 | Geisler et al. | |

\* cited by examiner

| Notification Services | User Devices | | | | |
|---|---|---|---|---|---|
| | 302 | 304 | 306 | 308 | 310 |
| WebRTC Service 322 | X | X | X | X | |
| WebRTC Service 324 | | X | X | | |
| WebRTC Service 326 | X | | | X | |
| Notification Service 328 | | | | X | |
| Notification Service 330 | | | | | X |

CENTRALIZED CONTROL OF USER DEVICES VIA UNIVERSAL IP SERVICES REGISTRAR/HUB

CROSS-REFERENCE TO RELATED APPLICATIONS

This application is a continuation of U.S. patent application Ser. No. 13/652,673, filed on Oct. 16, 2012 and issued as U.S. Pat. No. 10,084,848 on Sep. 25, 2018, the disclosure of which is incorporated herein by reference in its entirety.

BACKGROUND

As our daily activities become ever more reliant on access to and interaction with various web services, a growing problem facing a typical end user is that of the ability to streamline and optimize cross-device updates and events originated by web services. A particular challenge is to effectively monitor and navigate to and through the multiple services to which an end user has subscribed to use the desired feature or to access a given update or event. Web with Real Time Communication (WebRTC) services need to notify users and connect sessions, news services alert for news events, sports services alerts for sport scores, stock services alert for stock prices. The assumption of all of these services is that the user has exactly one device that needs to be alerted or, if the user has more than one device, the user will define alerts for each device at the service level. Some notifications need the user to have an active session (e.g. WebRTC). For some devices that get different Internet Protocol (IP) addresses each time they join the network (e.g. laptops), registrations are needed every time a new network address is acquired. Some notifications are sent to persistent addresses (e.g. mailboxes), and others are sent to a device identity whose IP address may change but the network resolves the identity (e.g. smartphones).

For many services that require the ability to connect two users together in real-time, the service is based on the user maintaining current registrations with the service.

Today, most users have multiple networked devices (laptop, smartphone, tablet, etc,) that may be used at different times. Some of those devices may be shared among several people (e.g. family members) and notifications should come to those devices only when the right individual is using the device. For example, suppose that Grace is a doctor who is on call for consultations from ten separate practices which use separate web-based services to communicate with medical professionals. Each of the services may have a separate unique login and password for Grace. When Grace logs onto the network from any device in the morning, she wants to be connected to all ten services from a single device. If Grace switches from her laptop at home to her cell phone and then to her laptop at work, she may want to inform all ten services to contact her to her work laptop. If Grace has multiple devices registered to all ten services simultaneously, she may want to be able to either have all the devices be informed of incoming messages, or to designate certain devices to communicate with certain services. However, no existing systems provide Grace with a centralized control over the relationship between a plurality of her devices and a plurality of services in the manner described in this example.

SUMMARY

In one embodiment, a method for centralized control of user devices via universal IP services registrar includes receiving a request to register a user device for a plurality of services, registering the user device for the plurality of services by creating a user settings profile for the user for each of the plurality of services, receiving data from the plurality of registered services, and transmitting received data to the user device in accordance with the user profile, wherein the user profile comprises user authentication parameters, user connection parameters, a list of user devices, data parameters, and data delivery parameters, wherein registering the user device for a plurality of services comprises: establishing a signaling connection to each of the plurality of services via an application programming interface of each of the plurality of services; and authenticating a user of the user device for each of the plurality of services, wherein establishing a signaling connection comprises providing the plurality of services with an Internet Protocol address, wherein creating a user profile for each of the plurality of services comprises: selecting a type of data to be delivered to the user device; selecting a schedule for data to be delivered to the user device; selecting default notification data; and selecting routing preferences for data to be delivered to the user device, and wherein routing preferences comprise: designating other user devices to receive data; designating conditions upon which data is to be delivered to other user devices; and designating conditions upon which data is to be delivered to the user device at times different from times selected in the schedule for data to be delivered to the user device.

In one other embodiment, Session Initiation Protocol (SIP)/IP Multimedia Subsystem (IMS) registrations and routing or similar commonly-used or standards-based messaging systems can be used to track the user and select the proper services to handle incoming requests.

DETAILED DESCRIPTION

A method and system provide for a centralized control of user devices via universal IP services registrar/hub where a method for centralized control of user devices via universal IP services registrar includes receiving a request to register a user device for a plurality of services, registering the user at the IP address representing an instance of the UIPSR (301) for the plurality of services by creating a user settings profile for the user for each of the plurality of services, receiving data from the plurality of registered services, and transmitting received data to one or more of the current registered user device(s) in accordance with the user profile. Functions and techniques performed by the universal IP services registrar/hub (UIPSR) for unified cross-application event management are described in detail with further references to the examples of FIGS. 1-7.

Figure 1:
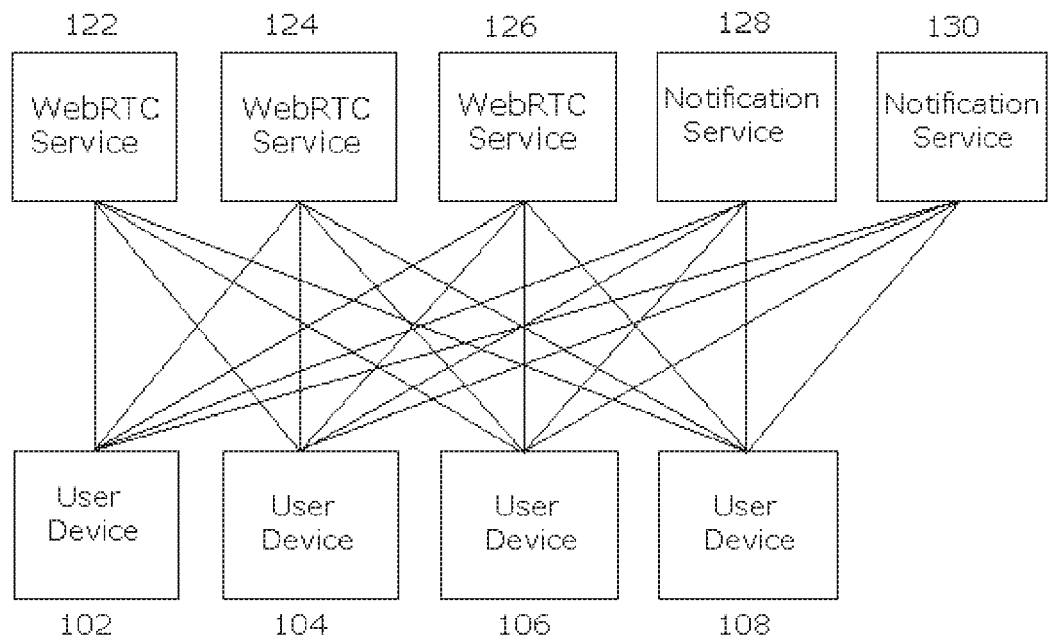
FIG. 1 illustrates an exemplary connection configuration of multiple user devices each being connected to a plurality of services in accordance with an embodiment.

FIG. 1 illustrates existing exemplary connection configuration of a plurality of exemplary user devices each being connected to a plurality of services. In such connection configuration, each of the plurality of exemplary user devices 102, 104, 106, and 108 (e.g., Laptop, Tablet, IP Television, Wireless Telephone, etc.) currently have to register with and connect to each available service (WebRTC Service 122, 124, and 126 and Notification Service 128, 130) in order to receive data from these services. For example, if a user has 5 services, as illustrated on FIG. 1, and wants to change the user devices for each service, the user needs to connect to each of the five services and update a change of a device for each service. In addition to maintaining all of the registrations, the user may want different types of data to go to different user devices. Some devices may not be able to handle all types of incoming data. For example, the user may have a preference that sports score updates got to his tablet rather than the TV or computer. In another example, a medical specialist, who is registered with multiple medical sites during the course of the day, may require that each of multiple medical sites sends messages to him/her at certain times and to certain devices and may access said sites with different devices. Using existing connection configurations, the medical specialist may need to spend hours daily updating each of the sites on how he/she should be reached.

Figure 2:
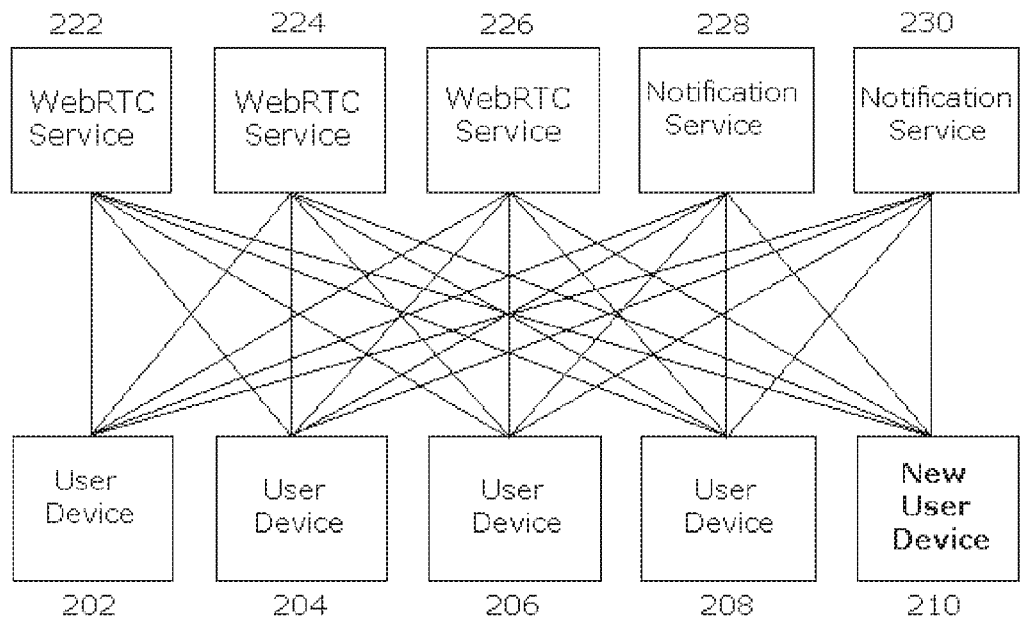
FIG. 2 illustrates exemplary connection of an additional user device to the plurality of services in the existing connection configuration in accordance with an embodiment.

FIG. 2 illustrates exemplary connection of an additional user device to the plurality of services in the existing connection configuration. Here, additional user device 210 currently has to connect separately to each available service (WebRTC Service 222, 224, and 226 and Notification Service 228, 230) in order to receive data from each of these services. Further, every time a device is turned on, it gets different IP addresses so the user needs to re-register with each of the services (e.g. AOL Instant Messenger) for the "new" device. Finally, user devices may change their IP addresses if they are on different networks because smartphones, tablets, or laptops (mobile devices) acquire a different IP address each time they change Wireless Fidelity, Wireless Internet (Wi-Fi) networks or move between Wi-Fi and cellular networks. That is, the IP address used for a smartphone over Wi-Fi may be different from the Mobile IP address used by the same smartphone over the wireless network; therefore, each modification would require new registrations at each server.

Figure 3A:
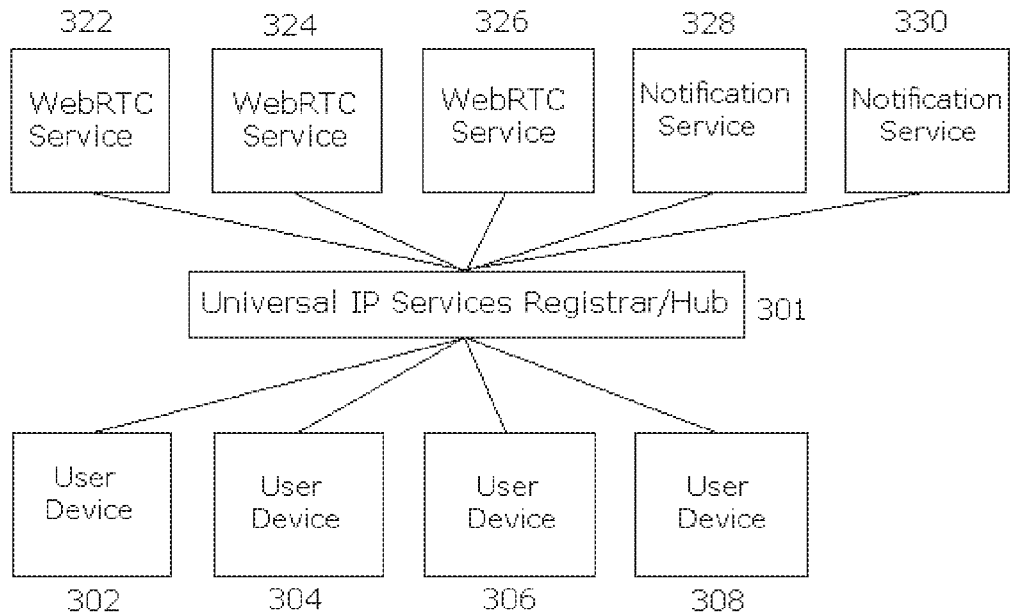
FIG. 3A illustrates an exemplary connection configuration of the plurality of user devices to the plurality of services via universal IP address registrar/hub in accordance with an embodiment.

FIG. 3A illustrates an exemplary connection configuration of the plurality of user devices to the plurality of services via a universal IP address registrar/hub (UIPSR). The UIPSR 301 is a universal centralized point of connection of the plurality of existing user devices 302, 304, 306, and 308 to the plurality of services 322, 324, 326, 328, and 330. In a preferred embodiment, as a universal centralized point of connection, the UIPSR 301 allows users to connect their multiple user devices to any number of services as long as the UIPSR 301 is connected to these services. Messages from these services would reach the user at any device based on the information kept at the UIPSR 301.

Figure 3B:
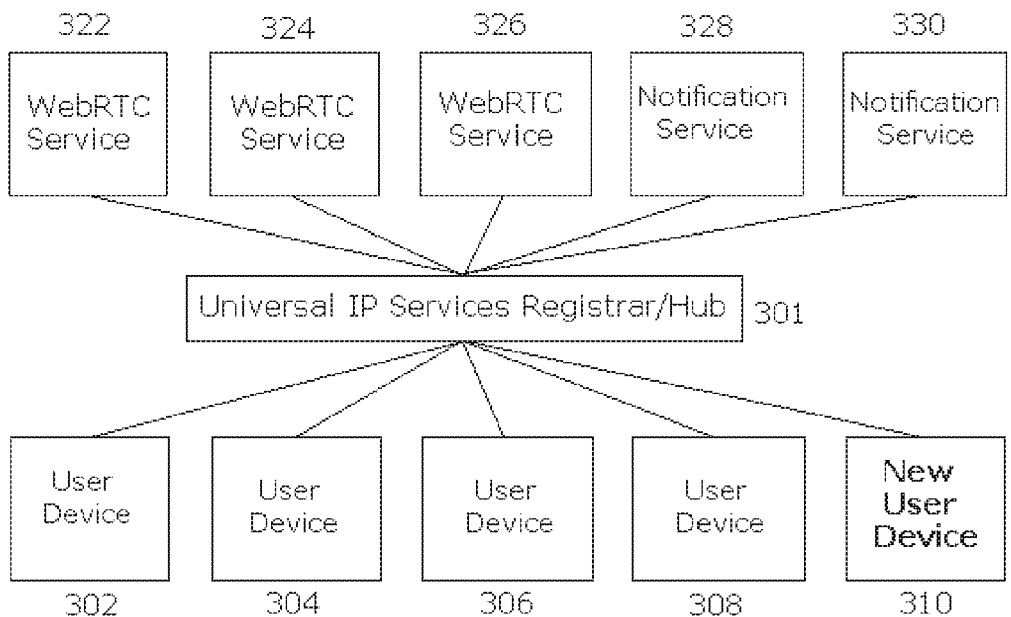
FIG. 3B illustrates exemplary connection of an additional user device to the plurality of services via universal IP address registrar/hub in accordance with an embodiment.

FIG. 3B illustrates a connection of a new user device 310 to the plurality of services 322, 324, 326, 328, and 330 via the UIPSR 301.

According to an embodiment, the UIPSR 301 may be any system, device, hardware, middleware, and/or software, and/or any combination thereof that is able to establish a connection with or be integrated with other devices and services, such as user devices 302, 304, 306, 308, and 310 and service providers 322, 324, 326, 328, and 330. In one embodiment, the UIPSR 301 may be coupled with user devices 302, 304, 306, 308, and 310 via at least one communication network (not shown). In another embodiment, the UIPSR 301 may be integrated in user devices 302, 304, 306, 308, and 310 as a utility service running on a background.

In another embodiment, the UIPSR 301 may be directly connected to user devices 302, 304, 306, 308, and 310. It is to be understood that the UIPSR 301 may be communicating with or accessed by user devices 302, 304, 306, and 308 and by service providers 322, 324, 326, 328, and 330 in the cloud. In addition, the UIPSR 301 may be configured to be available to user devices 302, 304, 306, 308, and 310 on demand, for example, based either on local processes occurring on user devices 302, 304, 306, 308, and 310 or based on processes driven by applications or services provided by service providers 322, 324, 326, 328, and 330. The availability of the UIPSR 301 to the user devices 302, 304, 306, 308 and 310 may be established with SIP registrations.

According to an embodiment, user devices 302, 304, 306, 308, and 310 can be any system and/or device, and/or any combination of devices/systems that is able to establish a connection with another device, a server and/or other systems such as the UIPSR 301 and/or services 322, 324, 326, 328, and 330. It is to be understood that user devices 302, 304, 306, 308, and 310 can include mobile or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a handheld tablet (e.g., an iPad), a handheld console, a set top box, a television or monitor, a handheld gaming device or console, and/or any other portable, mobile, handheld devices, etc.

According to an embodiment, services 322, 324, 326, 328, and 330 may provide applications, content, and services that include those used to read, generate and deliver emails, instant messages, SMS, or other forms of messages or voice or video phone calls. The messaging applications and communications services may also include social network-based applications such as Facebook®, Twitter®, Flickr®, Gtalk®, LinkedIn®, Skype®, or the like. The messaging applications and communications services may be based on WebRTC technology implemented in a browser or may use a dedicated application. Also, services 322, 324, 326, 328, and 330 may include financial (online banking, online trading), professional (medical, emergency, military) notifications, recreational (fantasy sports), etc. services. In one of the embodiments, disclosed UIPSR 301 may provide a more efficient interface, such as SIP/IMS, to enable a user to interact with multiple applications and communication channels via a common standards-based client.

According to an embodiment, at least one communication network (not shown), over which the user devices 302, 304, 306, 308, and 310 and the UIPSR 301 communicate, may be a cellular network, a telephonic network, an open network, such as the Internet, or a private network, such as an intranet and/or the extranet, a secure communications protocol, such as secure sockets layer (SSL), or transport layer security (TLS), or any combination thereof. For example, the Internet can provide file transfer, remote log in, email, news, RSS, cloud-based services, and other services through any known or convenient protocol, such as, but not limited to, the TCP/IP protocol, Open System Interconnections (OSI), File Transfer Protocol (FTP), Universal Plug and Play (UPnP), Internet Small Computer System Interface (iSCSI), Integrated Services Digital Network (ISDN), Plesiochronous Digital Hierarchy (PDH), RS-232 port, Synchronous Digital Hierarchy (SDH), Synchronous Optical NETwork (SONET), etc. A communication network can be any collection of distinct networks operating wholly or partially in conjunction to provide connectivity to the user devices 302-310 and to the UIPSR 301 and may appear as one or more networks to the services 322-330.

Communications also can be achieved via one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth®, Wi-Fi, Fixed Wireless Data, 2G, 2.5G, 3G, 4G, IMT-Advanced, pre-4G, 3G LTE, 3GPP LTE, LTE Advanced, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), SIP/SIMPLE, instant messaging and presence protocol (IMPP), instant messaging, USSD, IRC, or any other wireless data networks or messaging protocols.

According to an embodiment, content may be transmitted by way of a network and a cloud database that processes the information and determines the proper routing, recipients, and directional guidelines from the graphical user interface. This method allows content to flow from peer to peer while being temporarily cached at a centralized location with the UIPSR 301 providing content. The UIPSR 301 may employ several known and proprietary routing algorithms to ensure that the content is transmitted to the desired/intended audience. This may include content provided by the service at registration time that must be transmitted to the device before receiving the real-time message or content.

According to an embodiment, in order for a user to take advantage of the convenience of UIPSR functionality, each user device 302, 304, 306, 308, and 310 must be registered with the UIPSR 301. These registrations may be SIP Registrations and the UIPSR may play the role of a SIP Registrar in registering the endpoints. The UIPSR 301 registers with each service to which the customer subscribes. It is to be understood that the UIPSR 301 may need to be acquainted with a registration process for each service.

Figure 4:
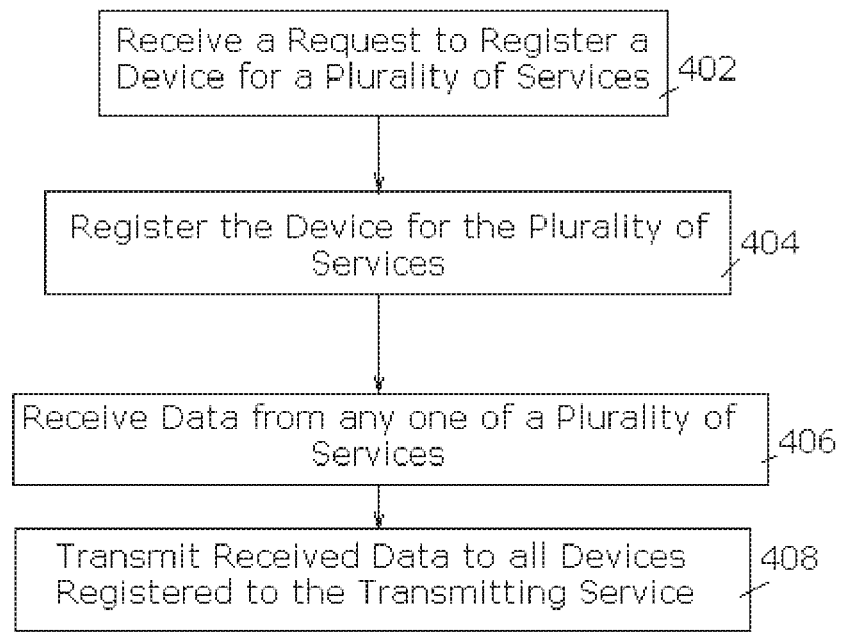
FIG. 4 illustrates an exemplary method for centralized control of user devices via universal IP services registrar/hub in accordance with an embodiment.

FIG. 4 illustrates an exemplary method for centralized control of user devices via universal IP services registrar/hub, (i.e., UIPSR 301). At step 402, a request to register a new user device 310 with a plurality of services 322, 324, 326, 328, and 330 is received by the UIPSR 301. It is to be understood that the request may be received via wired, wireless connection, or via motion-detected predefined physical gesture.

At step 404, the user device 310 is registered with the UIPSR 301 which can relay any incoming communications from the plurality of services 322, 324, 326, 328, and 330. An exemplary registration method for registering the new user device 310 with each of the plurality of services 322, 324, 326, 328, and 330 by the UIPSR 301 is illustrated on FIG. 5.

At step 408, the UIPSR 301, after receiving communications from any one of the services, sends the communication and any additional data received at registration, to the current device(s) that the user wants to receive the communication, as indicated in the user profile.

Figure 5:
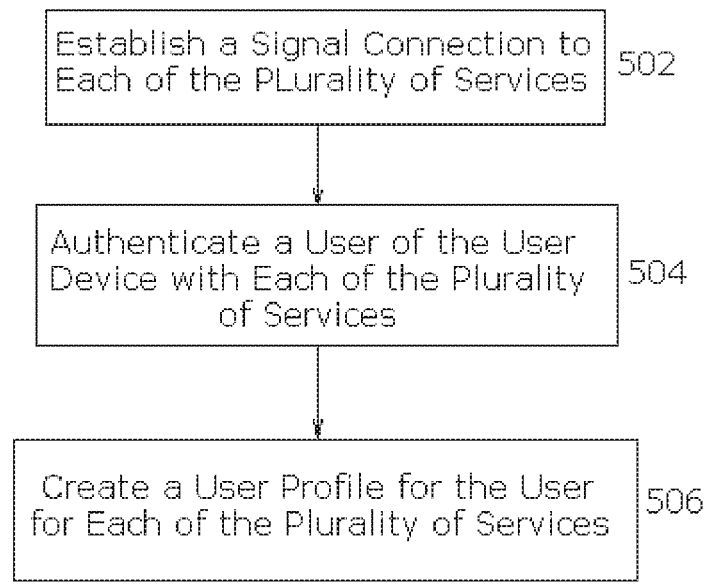
FIG. 5 illustrates an exemplary registration method for registering additional user device with each of the plurality of services by UIPSR in accordance with an embodiment.

The method of FIG. 5 can be used in the implementation of step 404 of FIG. 4. At step 502 of FIG. 5, a signal connection to each of the plurality of services is established by the UIPSR 301. Person skilled in the art will understand that, for such a signal connection to each of the plurality of services, the UIPSR 301 may need to obtain and/or interact with the Application Programming Interface (API) from each service 322, 324, 326, 328, and 330. API integration and interaction may be achieved through the use of individual API adapters or by following standards or accepted conventions of API integration.

In an embodiment, a mixture of standard-based and unique interfaces may be supported for API integration and signal connection. A result of establishing a signal connection between the UIPSR 301 and each of the plurality of services 322, 324, 326, 328, and 330 is that each service is provided with a single universal IP address of the UIPSR 301 for transmission of data between the UIPSR 301 and each of the plurality of services 322, 324, 326, 328, and 330.

At step 504, a user authentication with each of the plurality of services 322, 324, 326, 328, and 330 is performed by the UIPSR 301. In the scope of the user authentication process, the UIPSR 301 is to be provided with a user id/password for the new user device for each of the plurality of services 322, 324, 326, 328, and 330. It is to be appreciated that the UIPSR 301 may be provided with any number and/or type of unique user identifiers for the new user device for each of the plurality of services 322, 324, 326, 328, and 330. It is to be understood that the user authentication at step 504 needs to be performed only upon initial request to connect one or more user devices to a plurality of services. All subsequent authentication requests will be conducted by the UIPSR 301 upon detecting that a user intends to interact with any of the plurality of services through one or more user devices registered with the UIPSR 301.

Upon successful authentication of the new user device 310 with each service 322, 324, 326, 328, and 330, at step 506 of FIG. 5, a user profile is created by the UIPSR 301 for the new user device 310 for each service 322, 324, 326, 328, and 330. Information in the registration with the UIPSR 301 may be used to create the profile of how the device is used. The user profile may contain authentication parameters (e.g., user id, password, IP address, proxy server address, biometric data, etc), user connection parameters, a list of other user devices, data delivery parameters, data type parameters, scheduling parameters, default notification parameters, and data routing parameters. Individual device profiles may include the capabilities of the device, the services with which the device should be used, whether the device is mobile, software supported on the device and other preferences for the use of the device.

The following example illustrates how user profiles may be created and modified for each user device. When at home, outside of business hours, a user named Henry wants electronic invitations for computer gaming to be sent to his playstation and for all sports alerts to be sent to his computer. All work-related notifications have to be directed to his desktop computer unless these work-related notifications are sent by certain people. On his way to work, Henry wants real-time traffic notifications to be sent to his smartphone. Because, Henry is not available for multimedia calls, an announcement should be played providing a caller with an option to leave a multimedia message. Certain multimedia calls, depending on its type and/or calling party, may allow hands-free participation (if legal). At the office, Henry does not want to receive any gaming invitations. All work-related notifications should be directed to his work computer. When Henry is in a meeting, he does not want to be disturbed by any notifications except for ones related to sales workflow as it may need his approval of a price in real-time. Also, Henry wants to be able to switch profiles for his smartphone and his work computer in a single action from any of his devices.

Figures 6, 7:
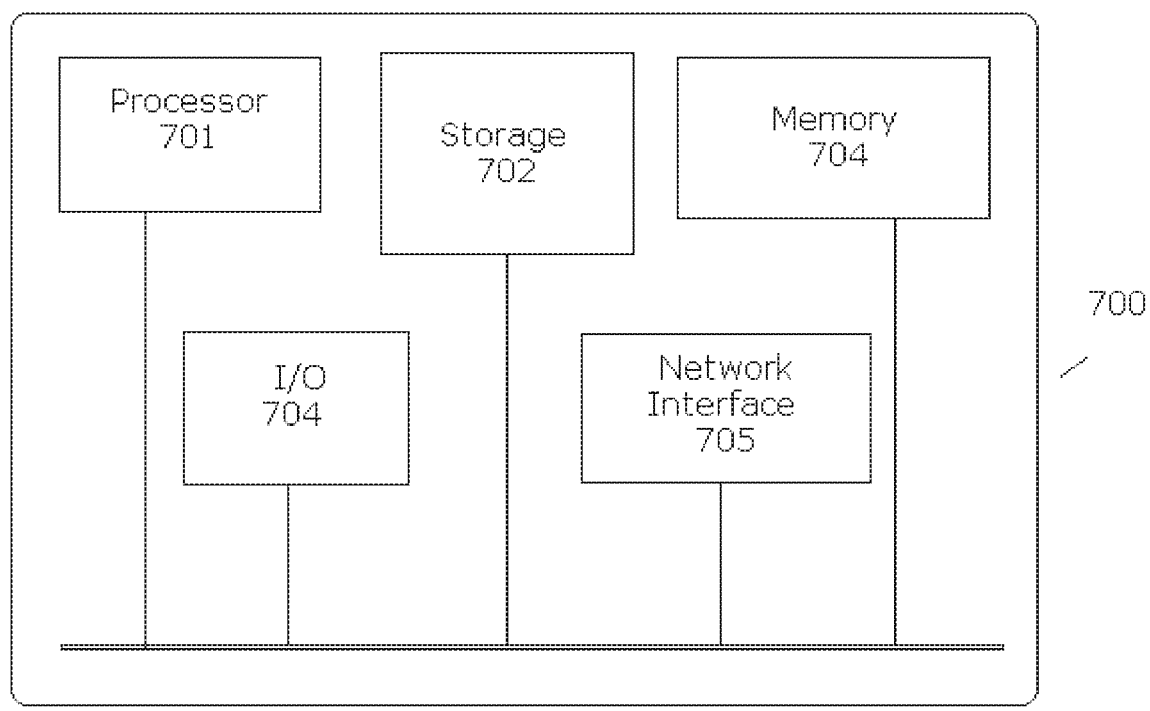
FIG. 6 illustrates an exemplary user profile matrix indicating data routing between a plurality of user devices and a plurality of services in accordance with an embodiment.
FIG. 7 illustratively depicts components of a computer that may be used to implement an exemplary system.

FIG. 6 illustrates an exemplary user profile matrix indicating data routing between a plurality of user devices and a plurality of services that may be generated in accordance with an embodiment. Particularly, the user profile matrix indicates from which of the plurality of services each of the user devices is scheduled to receive data. In general, the routing preferences in the user profile may include: (a) designation of other user devices to asynchronously receive incoming data, (b) designation of conditions upon which data is to be delivered to the user's other user devices, and (c) designation of conditions upon which data is to be delivered to the user device at times different from times selected in the scheduling parameters. In the illustrated embodiment of FIG. 6, user device 302 is enabled for WebRTC Service 322 and for WebRTC Service 326, while user device 310 is only enabled for Notification Service 330. One skilled in the art will recognize that the exemplary table of FIG. 6 is a non-limiting example and may include any additional and/or desired options, parameters, and settings.

The profiles for use of each device may be implemented by having requirements placed by the service or the UIPSR 301 matched against the capabilities declared by the device during registration.

Returning to FIG. 4, at step 406 data from one or more of a subscribed plurality of services 322, 324, 326, 328, and 330 is received by the UIPSR 301. At step 408, data received from subscribed services 322-330 is transmitted to one or more of the user devices 302, 304, 306, 308, and 310 by the UIPSR 301 in accordance with the user profile created and associated with each service sending data 322, 324, 326, 328, and 330. In an embodiment, data can be forwarded to all the registered endpoints or to a subset of those endpoints based on endpoint capabilities or user preferences.

In an embodiment, when devices are added or substituted, new user devices need to register only once with the UIPSR 301. There is no necessity to update each of the services separately. When there is a new service to be added, the user can add the service just once, having it communicate with the UIPSR 301, and indicate to the UIPSR 301 what rules to follow in distributing/forwarding data.

In an embodiment, the UIPSR 301 may provide a user with a unified access universal graphical user interface for consolidated access to user profiles. The unified access universal graphical user interface disclosed herein can be actuated and interacted with using any conventional or known input device including but not limited to physical keyboard, touch screen display, motion sensor, microphone, mouse, other types of pointer devices and any additional input device. The unified access and management of services 322, 324, 326, 328, and 330 may be provided by the UIPSR 301 locally on user devices 302, 304, 306, 308, and 310 to access services 322, 324, 326, 328, and 330 and data originated from these services (e.g., accounts, websites, services, documents, files, media, or any other data provided by a third party services).

In an advantageous embodiment, the disclosed unified access universal graphical user interface may further enable a user to perform the most commonly accessed functions of each of the services 322, 324, 326, 328, and 330 without having to launch or interact with services themselves. Also, the disclosed unified access universal graphical user interface may allow a user to have an integrated view of these functions across multiple services to provide the user with a more efficient way to check the status, notifications, or inbox (or its equivalent) of multiple services without having to launch and navigate through each of multiple messaging applications or communications channels.

In one embodiment, the unified access universal graphical user interface may enable the user to propagate, via the UIPSR 301, a single directive/instruction simultaneously to several services. For example, the user, who wishes to instruct all services to hold delivery of any data for a certain period of time, may elect an option to post a single instruction to all services 322, 324, 326, 328, and 330 via the UIPSR 301. Upon detection that such an option was selected, the user's instruction is translated by the UIPSR 301 into a corresponding appropriate format for each selected service and simultaneously propagated to the plurality of services 322, 324, 326, 328, and 330. In an embodiment, the unified access universal graphical user interface may duplicate already existing options provided by each of the plurality of services 322, 324, 326, 328, and 330.

One skilled in the art will recognize that the method of FIG. 4 is non-limiting and that components of the presented system may be combined in any way in various embodiments and may include any additional and/or desired components and/or configurations. The foregoing examples are to be understood as being in every respect illustrative but not restrictive.

FIG. 7 is a high-level block diagram of an exemplary computer that may be used for implementing a universal IP services registrar/hub. Computer 700 comprises a processor 701 operatively coupled to a data storage device 702 and a memory 703. Processor 701 controls the overall operation of computer 700 by executing computer program instructions that define such operations. The computer program instructions may be stored in data storage device 702, or other computer readable medium, and loaded into memory 703 when execution of the computer program instructions is desired. Thus, the steps of FIGS. 4 and 5 can be defined by the computer program instructions stored in memory 703 and/or data storage device 702 and controlled by processor 701 executing the computer program instructions. For example, the computer program instructions can be implemented as computer executable code programmed by one skilled in the art to perform an algorithm defined by the method steps of FIGS. 4 and 5. Accordingly, by executing the computer program instructions, the processor 701 executes an algorithm defined by the method steps of FIGS. 4 and 5. Computer 700 also includes one or more network interfaces 705 for communicating with other devices via a network. Computer 700 also includes one or more input/ output devices 704 that enable user interaction with computer 700 (e.g., display, keyboard, mouse, speakers, buttons, etc.).

Processor 701 may include both general and special purpose microprocessors, and may be the sole processor or one of multiple processors of computer 700. Processor 701 may comprise one or more central processing units (CPUs), for example. Processor 701, data storage device 702, and/or memory 703 may include, be supplemented by, or incorporated in, one or more application-specific integrated circuits (ASICs) and/or one or more field programmable gate arrays (FPGAs).

Data storage device 702 and memory 703 each comprise a tangible non-transitory computer readable storage medium. Data storage device 702, and memory 703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 705 may include peripherals, such as a printer, scanner, display screen, etc. For example, input/output devices 704 may include a display device such as a cathode ray tube (CRT), plasma or liquid crystal display (LCD) monitor for displaying information to the user, a keyboard, and a pointing device such as a mouse or a trackball by which the user can provide input to computer 700.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope disclosed herein is not to be determined from the Detailed Description, but rather from the claims as interpreted according to the full breadth permitted by the patent laws. It is to be understood that the embodiments shown and described herein are only illustrative of the principles and that various modifications may be implemented by those skilled in the art without departing from the scope disclosed herein. Those skilled in the art could implement various other feature combinations without departing from the scope disclosed herein.

The invention claimed is:

1. A method for transmitting data comprising:
   executing, by an end user device, a universal hub as a utility service running on a background, wherein the end user device is one of a plurality of user devices associated with a user;
   registering, by the universal hub of the end user device, the plurality of user devices for an internet service by creating a profile for each of the plurality of user devices;
   receiving, by the universal hub of the end user device, data from the internet service;
   identifying, by the universal hub of the end user device, certain user devices, from the plurality of user devices, to transmit the data to based on the profile for each of the plurality of user devices and a type of the data, and wherein the profile for each of the plurality of user devices comprises an identity of an entity providing the internet service; and
   transmitting, by the universal hub of the end user device, the data to the certain user devices.

2. The method of claim 1, further comprising: causing a user interface to display, on the certain user devices, an integrated view of notifications for the internet service based on the profiles for the certain user devices.

3. The method of claim 1, further comprising:
   registering the plurality of user devices for a plurality of other internet services;
   receiving a particular instruction from one of the plurality of user devices for sending to a plurality of services, the plurality of services comprising the internet service and the plurality of other internet services;
   translating the particular instruction into a plurality of translated instructions, each translated instruction of the plurality of translated instructions having a format corresponding to a respective service of the plurality of services; and
   transmitting each translated instruction to the respective service.

4. The method of claim 1, wherein the profile for each respective user device of the plurality of user devices defines a type of information to be delivered to the respective user device and a schedule for the information to be delivered to the respective user device.

5. The method of claim 1, wherein creating the profile for each of the plurality of user devices comprises matching requirements of the internet service with capabilities of each of the plurality of user devices.

6. The method of claim 1, wherein the data is temporarily cached during the transmitting the data to the certain user devices, wherein the receiving the data from the internet service by the universal hub of the end user device is based on a request from one of the plurality of user devices other than the end user device, wherein the profile for each of the plurality of user devices indicates delivery rules corresponding to device location, content type, calling party, meeting time, and wherein a first profile associated with a first user device is configured to be switched to a second user device utilizing a single user input.

7. The method of claim 1, wherein the data comprises a notification associated with the internet service.

8. The method of claim 1, wherein registering the plurality of user devices for the internet service by creating the profile for each of the plurality of user devices comprises:
   authenticating a user of the plurality of user devices for the internet service.

9. An apparatus for transmitting data comprising:
   a processor; and
   a memory to store computer program instructions, the computer program instructions when executed on the processor cause the processor to perform operations comprising:
   executing a universal hub as a utility service running on a background, wherein the apparatus is an end user device that is one of a plurality of user devices associated with a user;
   registering, by the universal hub, the plurality of user devices for an internet service by creating a profile for each of the plurality of user devices;

receiving, by the universal hub, data from the internet service;

identifying, by the universal hub, certain user devices, from the plurality of user devices, to transmit the data to based on the profile for each of the plurality of user devices and a type of the data, and wherein the profile for each of the plurality of user devices comprises an identity of an entity providing the internet service; and transmitting, by the universal hub, the data to the certain user devices.

10. The apparatus of claim 9, the operations further comprising: causing a user interface to display, on the certain user devices, an integrated view of notifications for the internet service based on the profiles for the certain user devices.

11. The apparatus of claim 9, the operations further comprising:

registering the plurality of user devices for a plurality of other internet services;

receiving a particular instruction from one of the plurality of user devices for sending to a plurality of services, the plurality of services comprising the internet service and the plurality of other internet services;

translating the particular instruction into a plurality of translated instructions, each translated instruction of the plurality of translated instructions having a format corresponding to a respective service of the plurality of services; and transmitting each translated instruction to the respective service.

12. The apparatus of claim 9, wherein the profile for each respective user device of the plurality of user devices defines a type of information to be delivered to the respective user device and a schedule for the information to be delivered to the respective user device.

13. The apparatus of claim 9, wherein creating the profile for each of the plurality of user devices comprises matching requirements of the internet service with capabilities of each of the plurality of user devices.

14. The apparatus of claim 9, wherein the data is temporarily cached during the transmitting the data to the certain user devices, wherein the receiving the data from the internet service by the universal hub of the apparatus is based on a request from one of the plurality of user devices other than the apparatus, wherein the profile for each of the plurality of user devices indicates delivery rules corresponding to device location, content type, calling party, meeting time, and wherein a first profile associated with a first user device is configured to be switched to a second user device utilizing a single user input.

15. A non-transitory computer readable device storing computer program instructions for transmitting data, which, when executed on a processor, cause the processor to perform operations comprising:

executing a universal hub as a utility service running on a background, wherein the processor is part of an end user device that is one of a plurality of user devices associated with a user;

registering, by the universal hub, the plurality of user devices for an internet service by creating a profile for each of the plurality of user devices;

receiving, by the universal hub, data from the internet service;

identifying, by the universal hub, certain user devices, from the plurality of user devices, to transmit the data to based on the profile for each of the plurality of user devices and a type of the data, and wherein the profile for each of the plurality of user devices comprises an identity of an entity providing the internet service; and transmitting, by the universal hub, the data to the certain user devices.

16. The non-transitory computer readable device of claim 15, the operations further comprising:

causing a user interface to display, on the certain user devices, an integrated view of notifications for the internet service based on the profiles for the certain user devices.

17. The non-transitory computer readable device of claim 15, the operations further comprising:

registering the plurality of user devices for a plurality of other internet services;

receiving a particular instruction from one of the plurality of user devices for sending to a plurality of services, the plurality of services comprising the internet service and the plurality of other internet services;

translating the particular instruction into a plurality of translated instructions, each translated instruction of the plurality of translated instructions having a format corresponding to a respective service of the plurality of services; and transmitting each translated instruction to the respective service.

18. The non-transitory computer readable device of claim 15, wherein the profile for each respective user device of the plurality of user devices defines a type of information to be delivered to the respective user device and a schedule for the information to be delivered to the respective user device.

19. The non-transitory computer readable device of claim 15, wherein the data comprises a notification associated with the internet service.

20. The non-transitory computer readable device of claim 15, wherein registering the plurality of user devices for the internet service by creating the profile for each of the plurality of user devices comprises:

authenticating a user of the plurality of user devices for the internet service.

* * * * *